Figure 1:
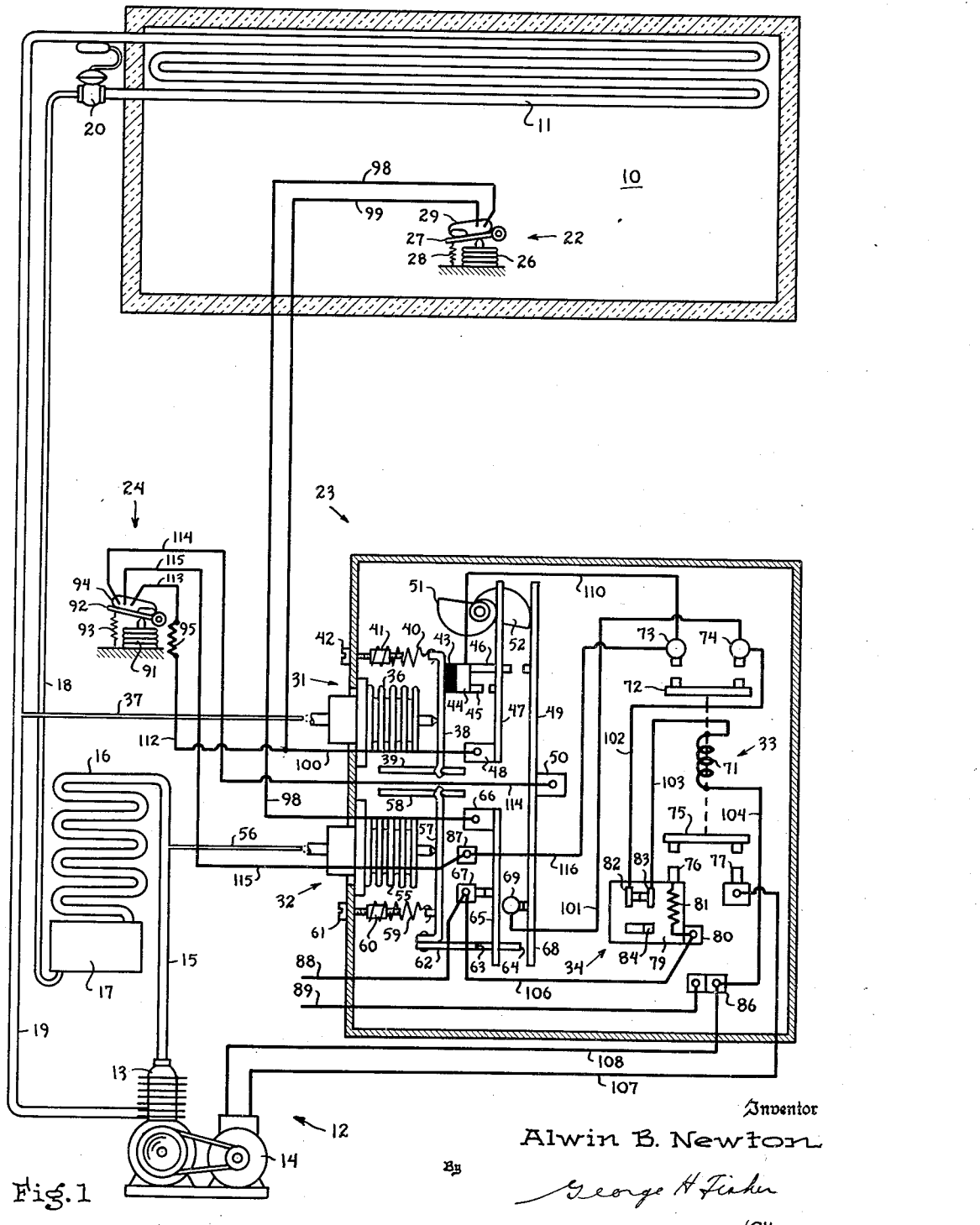

July 23, 1940.　　　A. B. NEWTON　　　2,209,102
REFRIGERATION CONTROL SYSTEM
Filed Feb. 24, 1939　　　2 Sheets-Sheet 2
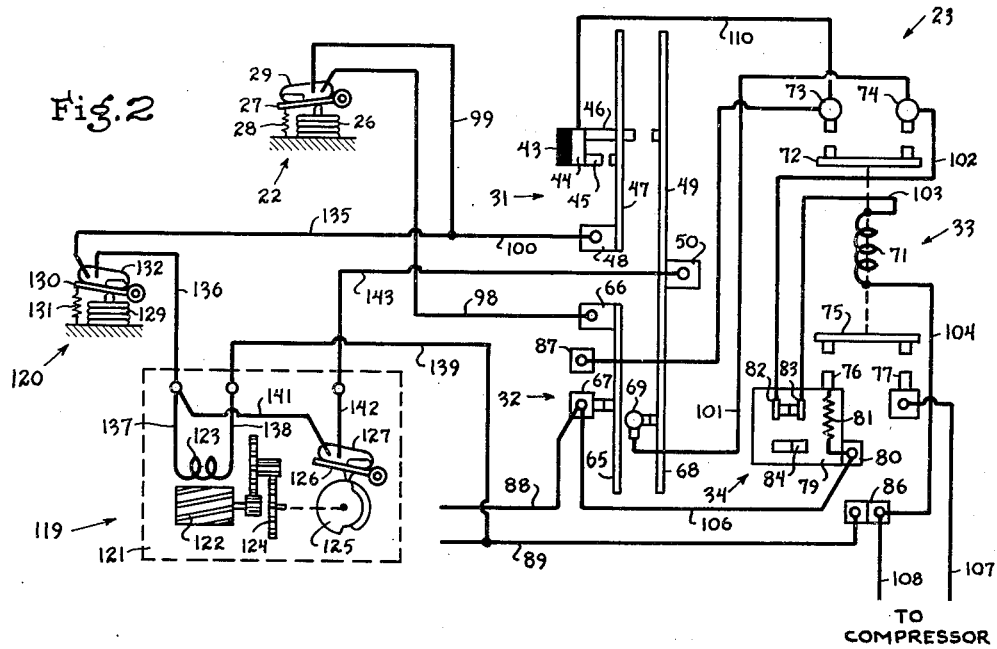
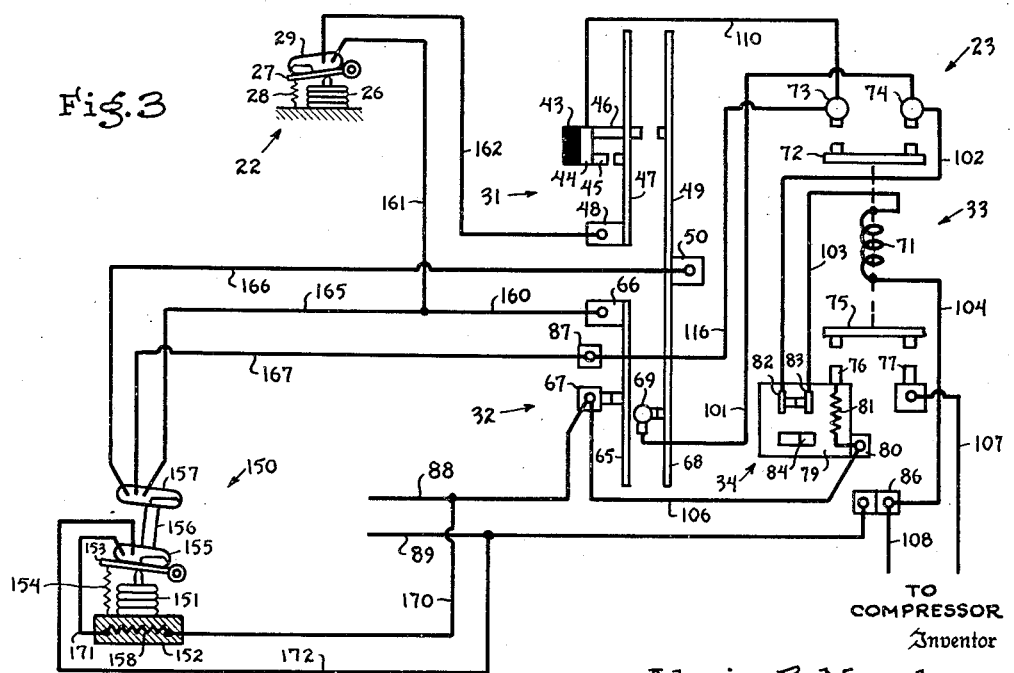
Inventor
Alwin B. Newton
By George H Fisher
Attorney Patented July 23, 1940

2,209,102

UNITED STATES PATENT OFFICE 2,209,102

REFRIGERATION CONTROL SYSTEM

Alwin B. Newton, Minneapolis, Minn., assignor to Minneapolis-Honeywell Regulator Company, Minneapolis, Minn., a corporation of Delaware Application February 24, 1939, Serial No. 258,230

20 Claims. (Cl. 62—4)

This invention relates to control systems for a refrigerating apparatus and particularly to a control system wherein the refrigerating apparatus is placed in operation only when the thermostatic control means calls for cooling, when the suction pressure rises to a predetermined high value which may be a defrosting value and when the head pressure decreases to a predetermined low value and wherein the refrigerating apparatus is maintained in operation until either the thermostatic control means is satisfied or the suction pressure decreases to a predetermined low value, or the head pressure increases to a predetermined high value. With such a control arrangement accurate temperature conditions are maintained, defrosting each cycle of operation is provided, starting of the compressor against high head pressures is prevented, and stopping of the compressor when the head pressure becomes too high or when the suction pressure becomes too low is provided.

When the compressor of the above outlined control system is located in a relatively cold location, such as a basement or an outside shed, it may well happen that in the winter-time ambient temperature around the compressor will be so low that the suction pressure cannot rise to the predetermined high defrosting value and under these conditions the compressor controlled by the above control system, could not be started.

It is therefore an object of this invention to avoid this difficulty by providing means for operating the compressor for an interval of time independently of the value of the suction pressure when the ambient temperature surrounding the compressor decreases to a predetermined value. In carrying out this feature of the invention a timing and temperature responsive means responsive to ambient temperature conditions surrounding the compressor is utilized for operating the compressor for an interval of time when the ambient temperature decreases below a predetermined value which value may be a value corresponding to a temperature value of the refrigerant slightly above the predetermined high suction pressure value. This means for starting operation of the compressor independently of suction pressure may be either a separate thermostatic means and a timing means or may be a combined timing means and thermostatic means. When the compressor has thus been operated for this interval of time the heat from the compressor and motor will usually increase the ambient temperature sufficiently so that the system will thereafter operate in the normal manner. If when the compressor is thus placed in operation by the timing means, the thermostatic means is calling for cooling, the suction pressure is above the predetermined low value and the head pressure is below the predetermined high value, the compressor will remain in operation until either the thermostatic control means becomes satisfied or the suction pressure decreases to the predetermined low value or the head pressure increases to the predetermined high value.

A further object of this invention is to have the timing and temperature responsive means start the compressor independently of the suction pressure and the thermostatic control means to tend to maintain the ambient temperatures surrounding the compressor sufficiently high at all times.

Still another object of this invention is to have the timing and temperature responsive means start the compressor independently of suction pressure only when the thermostatic control means is calling for cooling.

Still another object of this invention is to prevent starting of the compressor until the head pressure decreases to a predetermined low value regardless of whether the thermostatic control means or the timing and temperature responsive means demands starting of the compressor. In this manner starting of the compressor against high head pressures is at all times prevented.

Other objects and advantages will become apparent to those skilled in the art upon reference to the accompanying specification, claims, and drawings, in which:

Figure 1 diagrammatically illustrates one form of this invention utilizing a combined timing and temperature means for operating the compressor for a time interval independently of the suction pressure only when the thermostatic control means is calling for cooling.

Figure 2 is a diagrammatic illustration of a modified form of control arrangement wherein separate thermostatic means and timing means are utilized for placing the compressor in operation for a time interval regardless of suction pressure only when the thermostatic control means is calling for cooling, and Figure 3 is a diagrammatic illustration of still another form of this invention wherein a modified combined timing and temperature responsive means places the compressor in operation for an interval of time regardless of the suction pressure and the thermostatic control means.

For a more thorough understanding of this invention reference is made to Figure 1 wherein a fixture to be cooled is designated at 10. This fixture may comprise a space, a walk-in box, a storage compartment, a soda fountain, or any other apparatus which it is desired to cool. The fixture 10 is cooled by a cooling coil preferably in the form of an evaporator 11. Refrigerant is circulated through the evaporator 11 by a refrigerating apparatus generally designated at 12 which may comprise a compressor 13 operated by an electric motor 14. Compressed refrigerant flows from the compressor 13 through a high pressure line 15 into a condenser 16 and condensed refrigerant is collected in a receiver 17. Liquid refrigerant flows from the receiver 17 through a liquid line 18 into the evaporator 11 and evaporated refrigerant is withdrawn from the evaporator 11 through a suction line 19 by the compressor 13. The flow of refrigerant into the evaporator 11 may be controlled by an expansion valve shown to be a thermostatic expansion valve 20 of conventional design. Since the above construction is conventional in the art a further description thereof is not considered necessary it being sufficient to state that when the compressor 13 is placed in operation the evaporator 11 performs a cooling function.

The compressor motor 14 is controlled by a thermostatic control means generally designated at 22 and responsive to the temperature within the fixture 10, a unitary control arrangement generally designated at 23 responsive to changes in suction pressure and head pressure of the refrigerating apparatus and a timing and temperature responsive means generally designated at 24 responsive to ambient temperature conditions surrounding the compressor.

The thermostatic control means 22 may comprise a bellows 26 charged with a volatile fluid for operating a lever 27 against the action of an adjustable tension spring 28. The lever 27 operates a mercury switch 29 and for purposes of illustration it is assumed that when the temperature within the fixture 10 rises to 42°, the mercury switch is tilted to a closed position and when the temperature decreases to 40°, the mercury switch 29 is tilted to an open position.

The unitary control arrangement 23 may be of the type shown and described in application Serial No. 196,447 filed by Albert L. Judson and Carl G. Kronmiller on March 17, 1938. For purposes of illustration in this application the unitary control arrangement 23 is shown to comprise a suction pressure responsive control means generally designated at 31, a head pressure responsive control means generally designated at 32, a relay or starter generally designated at 33 and an overload cut-out device generally designated at 34.

The suction pressure responsive control means may include a bellows 36 connected by a pipe 37 to the suction line 19 of the refrigerating apparatus for operating a lever 38 fulcrumed on a fulcrum member 39 against the action of an adjustable tension spring 40. One end of the tension spring 40 is connected to the lever 38 and the other end is connected to a nut 41 screw-threadedly mounted on a screw 42. By rotating the screw 42 the tension in the spring 40 may be varied and hence the pressure setting of this portion of the instrument may be adjusted at will. The lever 38 carries an insulating pad 43 upon which is mounted a bridge member 44 carrying contacts 45 and 46. The contact 45 is adapted to engage a contact member 47 carried by a terminal 48 and the contact 46 is adapted to engage a contact member 49 carried by a terminal 50. A pair of independent adjustable concentrically located cams 51 and 52 operate to adjust independently the positions of the contact members 47 and 49 with respect to the contacts 45 and 46. For purposes of illustration it is assumed that upon an increase in suction pressure the contact 45 first engages the contact member 47 at 15 lbs. and then the contact 46 engages the contact member 49 at 32 lbs. Upon a decrease in suction pressure the contact 46 first disengages the contact member 49 at 32 lbs. and then the contact member 45 disengages the contact member 47 at 15 lbs. It is also assumed that the suction pressure can rise to 32 lbs. only after the evaporator 11 has defrosted. In other words, a suction pressure of 32 lbs. indicates that defrosting of the evaporator 11 has occurred.

The head pressure responsive control means 32 may comprise a bellows 55 connected by a pipe 56 to the high pressure line 15 for operating a lever 57 fulcrumed on a fulcrum member 58 against the action of an adjustable tension spring 59. One end of the tension spring 59 is connected to the lever 57 and the other end is connected to a nut 60 screw-threadedly mounted on a screw 61. By rotating the screw 61 the tension in the spring 59 may be adjusted and hence the pressure setting of this portion of the instrument may be adjusted at will. An abutment member 62, preferably made of insulating material and having abutments 63 and 64, is adjustably mounted on the lever 57 for movement therewith. The abutment 63 is adapted to engage a contact member 65 carried by a terminal 66 to separate the contact member 65 from a contact 67 and the abutment 64 is adapted to engage a contact member 68 carried by the terminal 50 to move the contact member 68 out of engagement with a contact 69. For purposes of illustration it is assumed that upon an increase in head pressure the contact member 68 is first moved out of engagement with the contact 69 when the head pressure increases to 140 lbs. and then the contact member 65 is moved out of engagement with the contact 67 when the head pressure increases to 180 lbs. Conversely, upon a decrease in head pressure the contact member 65 first engages the contact 67 at 180 lbs. and then the contact member 68 engages the contact 69 at 140 lbs.

The relay or starter generally designated at 33 may comprise an operating coil 71 for operating bridge members 72 and 75. When the operating coil 71 is energized the bridge member 72 is moved into engagement with contacts 73 and 74 and the bridge member 75 is moved into engagement with contacts 76 and 77. Upon de-energization of the operating coil 71 the bridge members 72 and 75 are moved out of engagement with their respective contacts by means of springs, gravity or other means (not shown).

The overload cut-out device 34 may comprise a casing 79 carrying a terminal 80. A heater element 81 connected between the terminal 80 and the contact 76 is adapted to heat a bi-metallic element upon an excessive current flow therethrough, to trip a latch (not shown) to separate control contacts 82 and 83. Hence, upon the occurrence of an overload condition the control contacts 82 and 83 are separated. The control contacts 82 and 83 may be manually reclosed by a manually operated reset lever 84.

The unitary control arrangement 23 also includes a power terminal 86 and a control terminal 87. Power is supplied to the compressor motor 14 and to the control system by means of line wires 88 and 89 leading from some source of power (not shown), the line wire 88 being connected to the contact 67 and the line wire 89 being connected to the power terminal 86.

The combined timing and temperature responsive means 24 may comprise a bellows 91 charged with a volatile fluid for operating a lever 92 against the action of an adjustable tension spring 93, the lever 92 in turn operating a mercury switch 94 having three electrodes at one end thereof. A heater 95 is utilized for heating the bellows 91 to raise the temperature of the bellows 91 above that of the ambient temperature under certain conditions. For purposes of illustration it is assumed that when the ambient temperature surrounding the compressor and hence the temperature of the bellows 91 decreases to 40° the mercury switch 94 is tilted to a closed position and when the temperature of the bellows 91 rises to 42° the mercury switch 94 is tilted to the open position shown in Figure 1. In other words, the differential of operation of the thermostatic means is substantially 2°. The heater 95 is so constructed that when it is energized it is capable of supplying sufficient heat to the thermostatic bellows 91 to raise the temperature thereof substantially 15° above the ambient temperature. With the parts of the combined timing and temperature responsive means thus selected and arranged when the ambient temperature surrounding the compressor decreases to 40° to close the switch 94 and heat the heater 95, the switch 94 will remain closed for an interval of substantially two minutes and will then remain open for an interval of substantially 30 minutes. If the ambient temperature decreases to 30°, the switch 94 will be closed for an interval of substantially 10 minutes and will be opened for an interval of substantially 5 minutes. If the ambient temperature decreases to 25° which is 15° below the setting of the temperature responsive means, it will be impossible to supply sufficient heat to raise the temperature of the thermostatic means above 42° and therefore the switch 94 will remain in a closed position. Accordingly, the switch 94 is moved to a closed position for an interval of time whenever the ambient temperature surrounding the compressor decreases below 40° and the length of the time interval increases as the temperature decreases below 40° until such time as the temperature decreases to 25° when the time interval becomes infinite.

Assume now that the ambient temperature surrounding the compressor is above 40° so that the system will operate in the normal manner, that the temperature within the fixture 10 rises to 42°, that the suction pressure rises to 32 lbs. and that the head pressure decreases to 140 lbs. Under these conditions a main starting circuit is completed through the operating coil 71 of the relay or starter 33 and this main starting circuit may be traced from the line wire 88 through contact 67, contact member 65, terminal 66, wire 98, mercury switch 29, wires 99 and 100, terminal 48, contact member 47, contact 45, bridge member 44, contact 46, contact members 49 and 68, contact 69, wire 101, contact 74, wire 102, control contacts 82 and 83, wire 103, operating coil 71, wire 104, and terminal 86 back to the other line wire 89. Completion of this main starting circuit energizes the operating coil 71 to move the bridge members 72 and 75 into engagement with their respective contacts.

Movement of the bridge member 75 into engagement with the contacts 76 and 77 completes a load circuit for the compressor motor 14 which may be traced from the line wire 88 through contact 67, wire 106, terminal 80, heater element 81, contact 76, bridge member 75, contact 77, wire 107, compressor motor 14, wire 108, and terminal 86 back to the other line wire 89. Completion of this circuit causes operation of the compressor 13. Accordingly, it is seen that when the fixture temperature rises to 42° the suction pressure rises to 32 lbs. and the head pressure decreases to 140 lbs., the compressor 13 is placed in operation to supply refrigerant to the evaporator 11 for cooling the fixture 10.

Movement of the bridge member 72 into engagement with the contacts 73 and 74 upon pulling in of the relay or starter 33 completes a main maintaining circuit for the starter or relay which is independent of the contact 46 and contact member 49 and the contact 69 and contact member 68. This main maintaining circuit may be traced from the line wire 88 through contact 67, contact member 65, terminal 66, wire 98, mercury switch 29, wires 99 and 100, terminal 48, contact member 47, contact 45, bridge member 44, wire 110, contact 73, bridge member 72, contact 74, wire 102, control contacts 82 and 83, wire 103, operating coil 71, wire 104, and terminal 86 back to the other line wire 89. Completion of this main maintaining circuit maintains the compressor 13 in operation even though the suction pressure decreases below 32 lbs. and the head pressure increases above 140 lbs. and this main maintaining circuit will maintain the compressor 13 in operation until either the temperature within the fixture 10 decreases to 40° to open the mercury switch 29 or until the suction pressure decreases to 15 lbs. to move the contact 45 out of engagement with the contact 47 or until the head pressure increases to 180 lbs. to move the contact member 65 out of engagement with the contact 67. When any of these contingencies occur the main maintaining circuit is broken and the relay or starter 33 is dropped out to stop operation of the compressor 13 and the compressor cannot again be restarted until such time as the main starting circuit outlined above is completed and this can occur only when the fixture temperature rises to 40°, the suction pressure rises to 32 lbs. and the head pressure decreases to 140 lbs.

Summing up the normal operation of the control system is as follows: the compressor is placed in operation only when the thermostatic control means 22 calls for cooling, the suction pressure increases to a predetermined high value (32 lbs.), and the head pressure decreases to a predetermined low value (140 lbs.) and is maintained in operation until either the thermostatic control means 22 becomes satisfied or the suction pressure decreases to a predetermined low value (15 lbs.) or the head pressure increases to a predetermined high value (180 lbs.).

Assume now that the ambient temperature surrounding the compressor decreases below the predetermined temperature value of 40°, say to 35°, whereupon it is impossible to start operation of the compressor in the manner outlined above since at this ambient temperature the suction pressure cannot rise to 32 lbs. Assume also that the head pressure decreases to 140 lbs. and that the fixture temperature increases to 42°. Under these conditions an auxiliary starting circuit for the relay or starter 33 is completed and it may be traced from the line wire 88 through contact 67, contact member 65, terminal 66, wire 98, mercury switch 29, wires 99 and 112, heater 95, wire 113, mercury switch 94, wire 114, terminal 50, contact member 68, contact 69, wire 101, contact 74, wire 102, control contacts 82 and 83, wire 103, operating coil 71, wire 104, and terminal 86 back to the other line wire 89. Completion of this auxiliary starting circuit pulls in the relay or starter 33 to operate the compressor 13. Pulling in of the relay or starter 33 also completes an auxiliary maintaining circuit which may be traced from the line wire 88 through contact 67, contact member 65, terminal 66, wire 98, mercury switch 29, wires 99 and 112, heater 95, wire 113, mercury switch 94, wire 115, control terminal 87, wire 116, contact 73, bridge member 72, contact 74, wire 102, control contacts 82 and 83, wire 103, operating coil 71, wire 104, and terminal 86 back to the other line wire 89. Completion of this maintaining circuit maintains the compressor in operation even though the head pressure rises above 140 lbs. to move the contact member 68 out of engagement with the contact member 69. It is here noted that the heater 95 of the combined timing and temperature responsive means 24 is located in both the auxiliary starting circuit and the auxiliary maintaining circuit and as pointed out above this heater 95 is energized as long as the mercury switch 94 is closed. After an interval of time depending upon the value of the ambient temperature surrounding the compressor the heater 95 heats the bellows 91 sufficiently to open the switch 94 to break the auxiliary starting and maintaining circuits to stop operation of the compressor. After the thermostatic element 91 cools down below 40° the above auxiliary starting and maintaining circuits are again completed and the compressor is restarted. If however at the time that the auxiliary starting and maintaining circuits are broken in the manner outlined above the thermostatic control means 22 is calling for cooling, the suction pressure is above the cut-out value of 15 lbs. and the head pressure is below the cut-out value of 180 lbs., the above outlined main maintaining circuit is established and the compressor will therefore remain in operation until such time as the thermostatic control means 22 becomes satisfied, or until the suction pressure decreases to 15 lbs., or until the head pressure increases to 180 lbs. With this operation it is usually only necessary to start the compressor once by the combined timing and temperature responsive means 24 since the operation of the compressor will usually raise the ambient temperature surrounding the compressor above 40° so that thereafter the system will continue to operate in the normal manner. If, as pointed out above, the ambient temperature should decrease to 25° the mercury switch 94 of the combined timing and temperature responsive means 24 will remain closed and hence the compressor will remain in operation until such time as the temperature of the bellows 91 increases to 42°. This will eventually occur inasmuch as the heat given off by the compressor will ordinarily raise the ambient temperature surrounding the compressor above this value.

From the above it is seen that Figure 1 contemplates a control arrangement wherein the compressor may be operated for an interval of time regardless of the value of suction pressure when the ambient temperature surrounding the compressor decreases to a predetermined low value providing the thermostatic control means is calling for cooling and the head pressure has decreased to 140 lbs., the length of the time interval increasing as the ambient temperature decreases below the predetermined value.

The control arrangement of Figure 2 utilizes the same thermostatic control means 22, the same unitary control arrangement 23, and same wiring connections for controlling the compressor as are utilized in Figure 1 and therefore like reference characters for like parts have been utilized. The only distinction between the structure and mode of operation of Figure 2 and that of Figure 1 is that in Figure 2 a separate timing means 119 and temperature responsive means 120 are utilized in place of the combined timing and temperature responsive means 24 of Figure 1.

The timing means 119 of Figure 2 may comprise a suitable housing 121 in which is mounted a rotor 122 influenced by a field winding 123. Through a reduction gear train 124 the rotor 122 operates an adjustable cam 125. The cam 125 in turn operates a lever 126 which in turn operates a mercury switch 127. The mercury switch 127 is normally open and for purposes of illustration it is assumed that the mercury switch 127 is moved to a closed position by the cam 125 for an interval of one minute every hour.

The temperature responsive means 120 may comprise a bellows 129 charged with a volatile fluid for operating a lever 130 against the action of an adjustable tension spring 131, the lever 130 in turn operating a mercury switch 132. The temperature responsive means 120 responds to the ambient temperature surrounding the compressor and for purposes of illustration it is assumed that when the temperature surrounding the compressor decreases to 40° the mercury switch 132 is closed and when the temperature increases to 42° the mercury switch is open.

Under normal conditions the control system of Figure 2 operates exactly the same as that of Figure 1 and a further description at this point is not considered necessary. Assume now that the head pressure decreases to 140 lbs., that the temperature within the fixture increases to 42° but that the ambient temperature surrounding the compressor is below 40° which prevents the suction pressure from rising to the starting value of 32 lbs. Under these conditions a circuit is completed from the line wire 88 through contact 67, contact member 65, terminal 66, wire 98, mercury switch 29, wires 99 and 135, mercury switch 132, wires 136 and 137, field winding 123 and wires 138 and 139 back to the other line wire 89. Completion of this circuit operates the timing means 119 and when the cam 125 has rotated sufficiently far to cause the mercury switch 127 to be closed, an auxiliary starting circuit for the relay or starter 33 is completed and this auxiliary starting circuit may be traced from the line wire 88 through contact 67, contact member 65, terminal 66, wire 98, mercury switch 29, wires 99 and 135, mercury switch 132, wires 136 and 141, mercury switch 127, wires 142 and 143, terminal 50, contact member 68, contact 69, wire 101, contact 74, wire 102, control contacts 82 and 83, wire 103, operating coil 71, wire 104, and terminal 86 back to the other line wire 89. Completion of this auxiliary starting circuit pulls in the relay or starter 33 to operate the compressor for an interval of time determined by the cam 125 of the timing means 119. At the expiration of this time interval the mercury switch 127 of the timing means 119 is opened and the compressor is stopped unless the suction pressure is above the cut-out value of 15 lbs. and the head pressure is below the cut-out value of 180 lbs. If this be the case the main maintaining circuit outlined above maintains the compressor in operation until either the thermostatic control means 22 becomes satisfied or the low pressure decreases to 15 lbs. or the head pressure increases to 180 lbs.

From the above it is seen that the control arrangement of Figure 2 operates substantially the same as the control arrangement of Figure 1, the main difference being that in Figure 2 the interval during which the compressor is operated by the timing means 119 remains substantially constant regardless of how far below the predetermined value the ambient temperature decreases.

The control system of Figure 3 utilizes the same thermostatic control means 22 and the same unitary control arrangement 23 as are utilized in Figure 1 but the control system of Figure 3 differs from that of Figure 1 in that a different combined timing and temperature responsive means 150 and different wiring connections are utilized.

Assume in Figure 3 that the temperature within the fixture rises to 42°, that the suction pressure increases to 32 lbs., and that the head pressure decreases to 140 lbs. Under these conditions a main starting circuit is completed from the line wire 88 through contact 67, contact member 65, terminal 66, wires 160 and 161, mercury switch 29, wire 162, terminal 48 and through the various contacts and the operating coil 71 back to the other line wire 89 in the manner pointed out above. Completion of this main starting circuit pulls in the relay or starter 33 to cause operation of the compressor as explained above. Pulling in of the relay or starter 33 completes a main maintaining circuit which may be traced from the line wire 88 through contact 67, contact member 65, terminal 66, wires 160 and 161, mercury switch 29, wire 162, terminal 48 and through the various contacts and operating coil 71 back to the other line wire 89 in the manner pointed out above. Completion of this main maintaining circuit therefore maintains the compressor in operation until such time as the fixture thermostatic control means 22 becomes satisfied or the suction pressure decreases to 15 lbs., or the head pressure increases to 180 lbs. Accordingly it is seen that the normal operation of Figure 3 is substantially the same as that of Figures 1 and 2.

In Figure 3 the combined timing and temperature responsive means 150 may comprise a bellows 151 charged with a volatile fluid and mounted on a mass 152 in such a manner that heat may be conducted from the mass 152 to the bellows 151. The bellows 151 operates a lever 153 against the action of an adjustable tension spring 154. The lever 153 operates a mercury switch 155 having two electrodes and operates through a suitable connection 156, a mercury switch 157 having three electrodes. For purposes of illustration it is assumed that when the temperature of the bellows 151 decreases to 40° the mercury switches 155 and 157 are tilted to a closed position and when the temperature of the bellows 151 rises to 42° the mercury switches 155 and 157 are tilted to the open position shown in Figure 3. A heater 158 thermally associated with the mass 152 is utilized for heating the mass 152 which in turn supplies heat to the bellows 151. When the ambient temperature decreases to 40° the heater 158 is energized to supply heat to the mass 152 which after a time interval supplies heat to the bellows 151 to raise the temperature of the bellows 151 to 42° to shut off the heater 158. The heater 158 and the mass 152 are so selected that when the ambient temperature is 40° the switches 155 and 157 will be closed for an interval of 2 minutes and will be opened for an interval of substantially 60 minutes. When the ambient temperature is 30° the switches 155 and 157 will be closed for an interval of 2½ minutes and will be opened for an interval of substantially 50 minutes. When the ambient temperature decreases to 20° the mercury switches 155 and 157 will be closed for an interval of 3 minutes and will be opened for an interval of substantially 40 minutes. The heater element 158 has sufficient capacity to insure that the temperature of the bellows 151 will be increased to 42° to open the switches 155 and 157 regardless of what value the ambient temperature may be.

Assume now that the head pressure decreases to 140 lbs. and that the ambient temperature surrounding the compressor decreases below 40°. Under these conditions an auxiliary starting circuit is completed from the line wire 88 through contact 67, contact member 65, terminal 66, wires 160 and 165, mercury switch 157, wire 166, terminal 50, contact member 68, contact 69, wire 101, contact 74, and thence through the operating coil 71 back to the other line wire 89. Completion of this starting circuit pulls in the relay or starter 33 to cause operation of the compressor in the manner outlined above and also completes an auxiliary maintaining circuit which may be traced from the line wire 88 through contact 67, contact member 65, terminal 66, wires 160 and 165, mercury switch 157, wire 167, control terminal 87, wire 116, contact 73, bridge member 72, contact 74, and thence through the operating coil 71 to the line wire 89. Completion of the auxiliary maintaining circuit maintains the compressor in operation until either the head pressure increases to 180 lbs. or the switch 157 is tilted to an open position. When the switch 157 is closed the switch 155 is likewise closed to complete a circuit from the line wire 88 through wire 170, heater element 158, wire 171, mercury switch 155, and wire 172 back to the other line wire 89. Hence, when the switches 155 and 157 are closed the heater element 158 is energized and after an interval of time depending somewhat upon the actual value of the ambient temperature the switches 155 and 157 are moved to an open position to stop operation of the compressor. It is here noted that the mercury switch 157 of combined timing and temperature responsive means 150 is located in parallel with the thermostatic control means 22 and not in series therewith as is the case in Figures 1 and 2, hence the combined timing and temperature responsive means 150 of Figure 3 may place the compressor in operation for an interval of time even though the thermostatic control means 22 is satisfied. In this respect the modification of Figure 3 differs from that of Figures 1 and 2. This has a definite advantage inasmuch as the combined timing and temperature responsive means tends at all times to maintain the ambient temperature surrounding the compressor above the predetermined value of 42°.

If when the combined timing and temperature responsive means 150 places the compressor in operation in the manner pointed out above the thermostatic control means is calling for cooling and the suction pressure is above the cut-out value of 15 lbs. and the head pressure is below the cut-out value of 180 lbs., then the compressor will be maintained in operation by the main maintaining circuit outlined above until either the thermostatic control means 22 becomes satisfied or the suction pressure decreases to 15 lbs. or the head pressure increases to 180 lbs. In this respect the control arrangement of Figure 3 operates similarly to that of Figures 1 and 2.

From the above it is seen that this invention contemplates a control arrangement wherein under normal operation the compressor cannot be placed in operation until the suction pressure increases to a predetermined high value of 32 lbs., illustratively a defrosting value and wherein a timing and temperature responsive means responsive to the ambient temperature surrounding the compressor may operate the compressor for an interval of time independent of suction pressure when the ambient temperature surrounding the compressor decreases below a predetermined value. In certain of the modifications the timing and ambient temperature responsive means can place the compressor in operation for the time interval only when the thermostatic control means is calling for cooling while in another it can place the compressor in operation for the time interval regardless of whether or not the thermostatic means is calling for cooling. In all modifications, if after the compressor has been placed in operation by the timing and temperature responsive means conditions are such as to require continued operation, the compressor will remain in operation until either the thermostatic control means is satisfied or the suction pressure decreases to a predetermined low value or the head pressure increases to a predetermined high value. In all modifications it is impossible to start the compressor until the head pressure decreases to a predetermined low value regardless of whether the compressor is to be started in the normal manner or by the timing and temperature responsive means.

Although for purposes of illustration several forms of this invention have been disclosed, other forms thereof may become apparent to those skilled in the art upon reference to this disclosure and therefore this invention is to be limited only by the scope of the appended claims and prior art.

I claim as my invention:

1. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, control means controlled by said condition responsive means and said suction pressure responsive means for starting operation of the compressor only when the condition responsive means calls for cooling and the suction pressure increases to a predetermined high value, timing means for starting the compressor independently of the suction pressure responsive means, and means responsive to the ambient temperature conditions of the medium surrounding the compressor to prevent the timing means from starting the compressor until the ambient temperature decreases to a predetermined value.

2. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, control means controlled by said condition responsive means and said suction pressure responsive means for starting operation of the compressor only when the condition responsive means calls for cooling and the suction pressure increases to a predetermined high value, timing means for starting the compressor independently of the suction pressure responsive means, and means responsive to the ambient temperature conditions of the medium surrounding the compressor to prevent the timing means from starting the compressor until the ambient temperature decreases to a value corresponding to a temperature value of the refrigerant slightly above the predetermined high suction pressure value.

3. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, control means controlled by said condition responsive means and said suction pressure responsive means for starting operation of the compressor only when the condition responsive means calls for cooling and the suction pressure increases to a predetermined high value, means responsive to the ambient temperature conditions of the medium surrounding the compressor to start the compressor independently of the suction pressure responsive means when the ambient temperature decreases to a predetermined low value, and timing means for limiting the length of time that the ambient temperature responsive means operates the compressor.

4. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, control means controlled by said condition responsive means and said suction pressure responsive means for starting operation of the compressor only when the condition responsive means calls for cooling and the suction pressure increases to a predetermined high value, means responsive to the ambient temperature conditions of the medium surrounding the compressor to start the compressor independently of the suction pressure responsive means when the ambient temperature decreases to a value corresponding to a temperature value of the refrigerant slightly above the predetermined high suction pressure value, and timing means for limiting the length of time that the ambient temperature responsive means operates the compressor.

5. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, control means controlled by said condition responsive means and said suction pressure responsive means for starting operation of the compressor only when the condition responsive means calls for cooling and the suction pressure increases to a predetermined high value, and timing means including means responsive to the ambient temperature conditions of the medium surrounding the compressor for operating the compressor for an interval of time when the ambient temperature decreases below a predetermined value.

6. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, control means controlled by said condition responsive means and said suction pressure responsive means for starting operation of the compressor only when the condition responsive means calls for cooling and the suction pressure increases to a predetermined high value, and timing means including means responsive to the ambient temperature conditions of the medium surrounding the compressor for operating the compressor for an interval of time when the ambient temperature decreases below a predetermined value, the length of the time interval increasing as the ambient temperature decreases below the predetermined value.

7. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, control means controlled by said condition responsive means and said suction pressure responsive means for starting operation of the compressor only when the condition responsive means calls for cooling and the suction pressure increases to a predetermined high value and for continuing operation of the compressor until either the condition responsive means is satisfied or the suction pressure decreases to a predetermined low value, and timing means including means responsive to the ambient temperature conditions of the medium surrounding the compressor for controlling said control means to operate the compressor for an interval of time when the ambient temperature decreases below a predetermined value.

8. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, control means controlled by said condition responsive means and said suction pressure responsive means for starting operation of the compressor only when the condition responsive means calls for cooling and the suction pressure increases to a predetermined high value and for continuing operation of the compressor until either the condition responsive means is satisfied or the suction pressure decreases to a predetermined low value, and timing means including means responsive to the ambient temperature conditions of the medium surrounding the compressor for controlling said control means to operate the compressor for an interval of time when the ambient temperature decreases below a predetermined value, the arrangement being such that when the compressor is placed in operation by the timing means, the compressor will remain in operation upon expiration of the time interval until either the condition responsive means is satisfied or the suction pressure decreases to the predetermined low value.

9. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, control means controlled by said condition responsive means and said suction pressure responsive means for starting operation of the compressor only when the condition responsive means calls for cooling and the suction pressure increases to a predetermined high value, and timing means including means responsive to the ambient temperature conditions of the medium surrounding the compressor and rendered operative when the condition responsive means is calling for cooling for operating the compressor for an interval of time when the ambient temperature decreases below a predetermined value.

10. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, control means controlled by said condition responsive means and said suction pressure responsive means for starting operation of the compressor only when the condition responsive means calls for cooling and the suction pressure increases to a predetermined high value and for continuing operation of the compressor until either the condition responsive means is satisfied or the suction pressure decreases to a predetermined value, and timing means including means responsive to the ambient temperature conditions of the medium surrounding the compressor and rendered operative when the condition responsive means is calling for cooling for controlling said control means to operate the compressor for an interval of time when the ambient temperature decreases below a predetermined value.

11. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, control means controlled by said condition responsive means and said suction pressure responsive means for starting operation of the compressor only when the condition responsive means calls for cooling and the suction pressure increases to a predetermined high value and for continuing operation of the compressor until either the condition responsive means is satisfied or the suction pressure decreases to a predetermined value, and timing means including means responsive to the ambient temperature conditions of the medium surrounding the compressor and rendered operative when the condition responsive means is calling for cooling for controlling said control means to operate the compressor for an interval of time when the ambient temperature decreases below a predetermined value, the arrangement being such that when the compressor is placed in operation by the timing means the compressor will remain in operation upon expiration of the time interval until either the condition responsive means is satisfied or the suction pressure decreases to the predetermined low value.

12. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, control means controlled by said condition responsive means and said suction pressure responsive means for starting operation of the compressor only when the condition responsive means calls for cooling and the suction pressure increases to a predetermined high value, and timing means including means responsive to the ambient temperature conditions of the medium surrounding the compressor and operative independently of the condition responsive means and the suction pressure responsive means for operating the compressor for an interval of time when the ambient temperature decreases below a predetermined value.

13. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, control means controlled by said condition responsive means and said suction pressure responsive means for starting operation of the compressor only when the condition responsive means calls for cooling and the suction pressure increases to a predetermined high value and for continuing operation of the compressor until either the condition responsive means is satisfied or the suction pressure decreases to a predetermined value and timing means including means responsive to the ambient temperature conditions of the medium surrounding the compressor and operative independently of the condition responsive means and the suction pressure responsive means for controlling said control means to operate the compressor for an interval of time when the ambient temperature decreases below a predetermined value.

14. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, control means controlled by said condition responsive means and said suction pressure responsive means for starting operation of the compressor only when the condition responsive means calls for cooling and the suction pressure increases to a predetermined high value, temperature responsive means responsive to the ambient temperature conditions of the medium surrounding the compressor for operating the compressor when the ambient temperature decreases below a predetermined value, and auxiliary heating means for the temperature responsive means energized when the ambient temperature decreases below said predetermined value for heating the temperature responsive means above the predetermined value.

15. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, control means controlled by said condition responsive means and said suction pressure responsive means for starting operation of the compressor only when the condition responsive means calls for cooling and the suction pressure increases to a predetermined high value, temperature responsive means responsive to the ambient temperature of the medium surrounding the compressor for operating the compressor when the ambient temperature decreases below a predetermined value and the condition responsive means is calling for cooling, and auxiliary heating means for the temperature responsive means energized when the ambient temperature decreases below said predetermined value for heating the temperature responsive means above the predetermined value.

16. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, control means controlled by said condition responsive means and said suction pressure responsive means for starting operation of the compressor only when the condition responsive means calls for cooling and the suction pressure increases to a predetermined high value and for continuing operation of the compressor until either the condition responsive means is satisfied or the suction pressure decreases to a predetermined low value, temperature responsive means responsive to the ambient temperature conditions of the medium surrounding the compressor for controlling said control means to operate the compressor when the ambient temperature decreases below said predetermined value, and auxiliary heating means for the temperature responsive means energized when the ambient temperature decreases below said predetermined value for heating the temperature responsive means above the predetermined value.

17. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, control means controlled by said condition responsive means and said suction pressure responsive means for starting operation of the compressor only when the condition responsive means calls for cooling and the suction pressure increases to a predetermined high value and for continuing operation of the compressor until either the condition responsive means is satisfied or the suction pressure decreases to a predetermined low value, temperature responsive means responsive to the ambient temperature conditions of the medium surrounding the compressor for controlling said control means to operate the compressor when the ambient temperature decreases below said predetermined value, and auxiliary heating means for the temperature responsive means energized when the ambient temperature decreases below said predetermined value for heating the temperature responsive means above the predetermined value, the arrangement being such that when the compressor is placed in operation by the temperature responsive means the compressor remains in operation until either the condition responsive means is satisfied or the suction pressure decreases to the predetermined low value.

18. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, control means controlled by said condition responsive means and said suction pressure responsive means for starting operation of the compressor only when the condition responsive means calls for cooling and the suction pressure increases to a predetermined high value, a time operated switch, a thermostatic switch operated to a closed position when the ambient temperature of the medium surrounding the compressor decreases to a predetermined low value, and means including the time operated switch and the thermostatic switch connected in series for operating the compressor when the time operated switch and the thermostatic switch are closed.

19. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, means responsive to variation in head pressure, control means controlled by the condition responsive means, the suction pressure responsive means and the head pressure responsive means for starting operation of the compressor only when the condition responsive means calls for cooling, the suction pressure increases to a predetermined high value and the head pressure decreases to a predetermined low value and for continuing the compressor in operation until either the condition responsive means is satisfied or the suction pressure decreases to a predetermined low value or the head pressure increases to a predetermined high value, and timing means including means responsive to the ambient temperature conditions of the medium surrounding the compressor for controlling the control means to allow operation of the compressor for an interval of time when the ambient temperature decreases below a predetermined value even though the suction pressure is below the predetermined high value.

20. In a control system for a refrigerating apparatus having evaporator means for controlling the condition of a medium and a compressor for circulating refrigerant through the evaporator means, the combination of, means responsive to the condition of the medium being controlled by the evaporator means, means responsive to variations in suction pressure, means responsive to variation in head pressure, control means controlled by the condition responsive means, the suction pressure responsive means and the head pressure responsive means for starting operation of the compressor only when the condition responsive means calls for cooling, the suction pressure increases to a predetermined high value and the head pressure decreases to a predetermined low value and for continuing the compressor in operation until either the condition responsive means is satisfied or the suction pressure decreases to a predetermined low value or the head pressure increases to a predetermined high value, and timing means including means responsive to the ambient temperature conditions of the medium surrounding the compressor for controlling the control means to allow operation of the compressor for an interval of time when the ambient temperature decreases below a predetermined value even though the suction pressure is below the predetermined high value, the arrangement being such that when the compressor is placed in operation by the timing means the compressor will remain in operation upon the expiration of the time interval until either the condition responsive means is satisfied or the suction pressure decreases to the predetermined low value or the head pressure increases to the predetermined high value.

ALWIN B. NEWTON.

CERTIFICATE OF CORRECTION.

Patent No. 2,209,102.                                        July 23, 1940.

ALWIN B. NEWTON.

It is hereby certified that error appears in the printed specification of the above numbered patent requiring correction as follows: Page 6, first column, line 69, and second column, lines 15, 36 and 58, page 7, first column, lines 8, 27, 52 and 75, and second column, lines 27 and 51, page 8, first column, lines 2, 30 and 55, and second column, lines 3 and 54, page 9, first column, line 6, and second column, lines 10 and 39, claims 1 to 14, 16, 17, 19 and 20 respectively, strike out the word "conditions"; and that the said Letters Patent should be read with this correction therein that the same may conform to the record of the case in the Patent Office.

Signed and sealed this 19th day of November, A. D. 1940.

(Seal)                                                                Henry Van Arsdale,
                                                                            Acting Commissioner of Patents.